(12) United States Patent
Kharaghani et al.

(10) Patent No.: US 10,776,697 B2
(45) Date of Patent: Sep. 15, 2020

(54) SYSTEM AND METHOD FOR TRAINING A NEURAL NETWORK

(71) Applicant: Huawei Technologies Co., Ltd., Shenzhen (CN)

(72) Inventors: Sepideh Kharaghani, Markham (CA); Vanessa Courville, Markham (CA); Barnaby Dalton, Mississauga (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 679 days.

(21) Appl. No.: 15/490,544

(22) Filed: Apr. 18, 2017

(65) Prior Publication Data

US 2018/0300629 A1 Oct. 18, 2018

(51) Int. Cl.
| | |
|---|---|
| G06F 9/44 | (2018.01) |
| G06F 16/36 | (2019.01) |
| G06F 16/24 | (2019.01) |
| G06F 9/00 | (2006.01) |
| G06F 16/84 | (2019.01) |
| G06N 3/08 | (2006.01) |
| G06N 3/04 | (2006.01) |

(52) U.S. Cl.
CPC .......... *G06N 3/082* (2013.01); *G06N 3/0472* (2013.01); *G06N 3/084* (2013.01)

(58) Field of Classification Search
CPC ....... G06N 3/082; G06N 3/0472; G06N 3/084
USPC ...................................... 706/1–62
See application file for complete search history.

(56) References Cited

U.S. PATENT DOCUMENTS

2008/0001735 A1* 1/2008 Tran .................. G06F 19/00
340/539.22
2008/0281767 A1 11/2008 Garner
(Continued)

FOREIGN PATENT DOCUMENTS

| CN | 103903003 A | 7/2014 |
|---|---|---|
| CN | 105426962 A | 3/2016 |
| CN | 105512725 A | 4/2016 |

OTHER PUBLICATIONS

Wan, L., et al., "Regularization of Neural Networks using DropConnect", 2013, Proceedings of the 30th International Conference on Machine Learning, PMLR 28(3): pp. 1058-1066. (Year: 2013).*
(Continued)

*Primary Examiner* — Brandon S Cole
(74) *Attorney, Agent, or Firm* — Slater Matsil, LLP

(57) ABSTRACT

A method for training a neural network comprising at least one layer comprising a plurality of input nodes, a plurality of output nodes, and a plurality of connections for connecting each one of the plurality of input nodes to each one of the plurality of output nodes, is provided. The method comprises pseudo-randomly selecting a subset of the plurality of connections, each connection of the plurality of connections having associated therewith a weight parameter and a probability of being retained in the neural network, generating output data by feeding input data over the subset of connections, computing an error between the generated output data and desired output data, and, for at least one connection in the subset of connections, determining a contribution of the weight parameter to the error and updating the probability of being retained in the neural network accordingly.

16 Claims, 9 Drawing Sheets

(56) References Cited

U.S. PATENT DOCUMENTS

| | | | | |
|---|---|---|---|---|
| 2013/0325774 A1* | 12/2013 | Sinyavskiy | ............ | G06N 3/049 706/23 |
| 2013/0325776 A1* | 12/2013 | Ponulak | ............... | G05B 13/027 706/25 |
| 2014/0081895 A1* | 3/2014 | Coenen | .................... | G06N 3/08 706/25 |
| 2014/0277795 A1* | 9/2014 | Matsuoka | ............. | H04W 12/06 700/291 |
| 2015/0269244 A1* | 9/2015 | Qamar | ............. | G06Q 10/06398 705/7.42 |

OTHER PUBLICATIONS

Ba, J., et al. "Adaptive dropout for training deep neural networks", 2013, in: Advances in Neural Information Processing Systems, 2013, pp. 3084-3092. (Year: 2013).*

Li Wan, Matthew Zeiler, Sixin Zhang, Yann L. Curl, and Rob Fergus. "Regularization of neural networks using dropconnect". In Proceedings of the 30th International Conference on Machine Learning (ICML-2013).

Srivastava, Nitish, Hinton, Geoffrey, Krizhevsky, Alex, Sutskever, Ilya, and Salakhutdinov, Ruslan. "Dropout: A simple way to prevent neural networks from overfitting". JMLR, 15:1929-1958, 2014.

Han, Song, Pool, Jeff, Tran, John, and Daily, William J. "Learning both weights and connections for efficient neural networks", In Advances in Neural Information Processing Systems, 2015.

Richard S. Sutton and Andrew G. Barto. "Introduction to Reinforcement Learning". First Edition, 1998.

* cited by examiner

SYSTEM AND METHOD FOR TRAINING A NEURAL NETWORK

FIELD

Embodiments described herein generally relate to the field of neural networks, more particularly to training deep neural networks having multiple fully-connected layers.

BACKGROUND

Neural networks are used to approximate functions that can depend on a large number of unknown inputs. Neural networks are generally represented as systems of interconnected neurons (also referred to as nodes), which exchange messages with each other. The connections between the nodes of a neural network are assigned numeric weights, each of which characterizes the manner in which an input to a given node is related to an output to the node. Each weight multiplies (and accordingly modifies) an input to a given node to generate an output. The weights can be tuned using various optimization methods, such as stochastic gradient descent in order to change the response of the neural network to a particular input.

As neural networks become more complex, they can be arranged to have multiple layers of connected nodes. These multiply-layered neural networks are often referred to as deep neural networks. Deep neural networks are often models that can learn complex relationships between their inputs (also referred to as input nodes) and their outputs (also referred to as output nodes). A layer may, for example, have n input nodes ($x_1, x_2, \ldots, x_n$) and m output nodes ($y_1, y_2, \ldots, y_m$). The number of input nodes may be different from the number of output nodes (e.g. n does not always equal m), and the number of input nodes of a given layer may also be different from the number of input nodes of another layer. Each layer maps the input nodes to the output nodes, in a way that is specific to the type of layer. The outputs from one layer are the inputs to the next layer.

One type of layer found in neural networks is a fully connected layer, in which every input node is connected to every output node, such that the output of a given node i can be represented as $y_i = w_{i,1} * x_1 + w_{i,2} * x_2 + \ldots + w_{i,n} * x_n$, where $w_z$ represents the weight applied to the input z. This may also be represented using matrices as $y = W \cdot x$, where x is an n-dimensional input vector, y is an m-dimensional output vector, W is an m×n matrix of connection parameters (also referred to as weights), and · represents a dot product. When implementing the neural network on a computer, n×m connection parameters are loaded from memory and n×m computations are performed. Some of the larger layers of publicly tested and demonstrated neural networks have up to n=9216 and m=4096, with 32-bit values for each weight. Layers of this size can involve 150 MB of data to be processed in each iteration. This can become problematic in memory-constrained or low-power devices.

A number of solutions have been proposed to reduce the number of connection parameters in neural networks. However, existing solutions are either manual or require significant additional training time typically measured in tens or hundreds of clock hours. There is therefore a need for an improved system and method for training a neural network.

SUMMARY

In accordance with one aspect, there is provided a method for training a neural network, the neural network comprising at least one layer comprising a plurality of input nodes, a plurality of output nodes, and a plurality of connections for connecting each one of the plurality of input nodes to each one of the plurality of output nodes. The method comprises pseudo-randomly selecting a subset of the plurality of connections, each connection of the plurality of connections having associated therewith a weight parameter and a probability of being retained in the neural network, generating output data by feeding input data over the subset of connections, computing an error between the generated output data and desired output data, and for at least one connection in the subset of connections, determining a contribution of the weight parameter to the error and updating the probability of being retained in the neural network accordingly.

In some example embodiments, the method may comprise, for each connection of the plurality of connections, pseudo-randomly setting the probability of being retained to a value p greater than or equal to zero and smaller than or equal to one.

In some example embodiments, pseudo-randomly selecting the subset of connections may comprise applying a pseudo-randomly generated binary mask to each weight parameter for retaining first ones of the plurality of connections in the network with probability p and temporarily dropping second ones of the plurality of connections from the network with probability 1−p, the first connections forming the subset of connections.

In some example embodiments, applying the pseudo-randomly generated binary mask to each weight parameter comprises applying a unitary mask element to the weight parameter associated with each connection in the first plurality of connections and applying a null mask element to the weight parameter associated with each connection in the second plurality of connections.

In some example embodiments, the method may further comprise generating a binary mask matrix comprising generating a pseudo-random matrix, each element of the pseudo-random matrix having a value greater than or equal to zero and smaller than or equal to one, comparing each element of the pseudo-random matrix to a corresponding element of a probability matrix, each element of the probability matrix corresponding to the probability of being retained associated with a given one of the plurality of connections, assigning a value of one to a corresponding element of the binary mask matrix when the element of the probability matrix is greater than the element of the pseudo-random matrix, and assigning a value of zero to a corresponding element of the binary mask matrix when the element of the probability matrix is not greater than the element of the pseudo-random matrix.

In some example embodiments, the probability may be updated based on a reinforcement signal comprising, for the at least one connection in the subset of connections, attributing a positive reward to the at least one connection when the weight parameter contributes to reducing the error and attributing a negative reward to the at least one connection when the weight parameter contributes to increasing the error.

In some example embodiments, attributing the positive reward may comprise increasing the probability associated with the at least one connection and attributing the negative reward comprises decreasing the probability associated with the at least one connection.

In some example embodiments, the method may further comprise, for the at least one connection, modifying the weight parameter associated therewith for reducing the error upon new input data being fed through the at least one layer, the weight parameter modified based on a gradient of the weight parameter.

In accordance with another aspect, there is provided a neural network unit comprising at least one processing unit; and a non-transitory memory communicatively coupled to the at least one processing unit and comprising computer-readable program instructions that when executed by the at least one processing unit cause the neural network unit to pseudo-randomly select a subset of connections among a plurality of connections of a neural network layer, each connection of the plurality of connections having associated therewith a weight parameter and a probability of being retained in the neural network, generate output data by feeding input data over the subset of connections, compute an error between the generated output data and desired output data, and, for at least one connection in the subset of connections, determine a contribution of the weight parameter to the error and update the probability of being retained in the neural network accordingly.

In some example embodiments, when the instructions are executed by the at least one processing unit, the neural network may be caused to, for each connection of the plurality of connections, pseudo-randomly set the probability of being retained to a value p greater than or equal to zero and smaller than or equal to one.

In some example embodiments, when the instructions are executed by the at least one processing unit, the neural network may be caused to, apply a pseudo-randomly generated binary mask to each weight parameter for retaining first ones of the plurality of connections in the network with probability p and temporarily dropping second ones of the plurality of connections from the network with probability 1−p, the first connections forming the subset of connections.

In some example embodiments, when the instructions are executed by the at least one processing unit, the neural network may be caused to, apply a unitary mask element to the weight parameter associated with each connection in the first plurality of connections and apply a null mask element to the weight parameter associated with each connection in the second plurality of connections.

In some example embodiments, when the instructions are executed by the at least one processing unit, the neural network may be caused to, generate a binary mask matrix comprising generating a pseudo-random matrix, each element of the pseudo-random matrix having a value greater than or equal to zero and smaller than or equal to one, comparing each element of the pseudo-random matrix to a corresponding element of a probability matrix, each element of the probability matrix corresponding to the probability of being retained associated with a given one of the plurality of connections, assigning a value of one to a corresponding element of the binary mask matrix when the element of the probability matrix is greater than the element of the pseudo-random matrix, and assigning a value of zero to a corresponding element of the binary mask matrix when the element of the probability matrix is not greater than the element of the pseudo-random matrix.

In some example embodiments, when the instructions are executed by the at least one processing unit, the neural network may be caused to, update the probability based on a reinforcement signal comprising, for the at least one connection, attributing a positive reward to the at least one connection when the weight parameter contributes to reducing the error and attributing a negative reward to the at least one connection when the weight parameter contributes to increasing the error.

In some example embodiments, when the instructions are executed by the at least one processing unit, the neural network may be caused to, attribute the positive reward comprising increasing the probability associated with the at least one connection and attribute the negative reward comprising decreasing the probability associated with the at least one connection.

In some example embodiments, when the instructions are executed by the at least one processing unit, the neural network may be caused to, modify the weight parameter associated with the at least one connection based on the gradient of the weight parameter for reducing the error towards zero upon new input data being fed through the layer.

In accordance with another aspect, there is provided a non-transitory computer readable medium having stored thereon program code executable by at least one processor for pseudo-randomly selecting a subset of the plurality of connections, each connection of the plurality of connections having associated therewith a weight parameter and a probability of being retained in the neural network, generating output data by feeding input data over the subset of connections, computing an error between the generated output data and desired output data, and, for at least one connection in the subset of connections, determining a contribution of the weight parameter to the error and updating the probability of being retained in the neural network accordingly.

Many further features and combinations thereof concerning the present improvements will appear to those skilled in the art following a reading of the instant disclosure.

DESCRIPTION OF THE FIGURES

In the figures.

It will be noted that throughout the appended drawings, like features are identified by like reference numerals.

DETAILED DESCRIPTION

Figure 1:
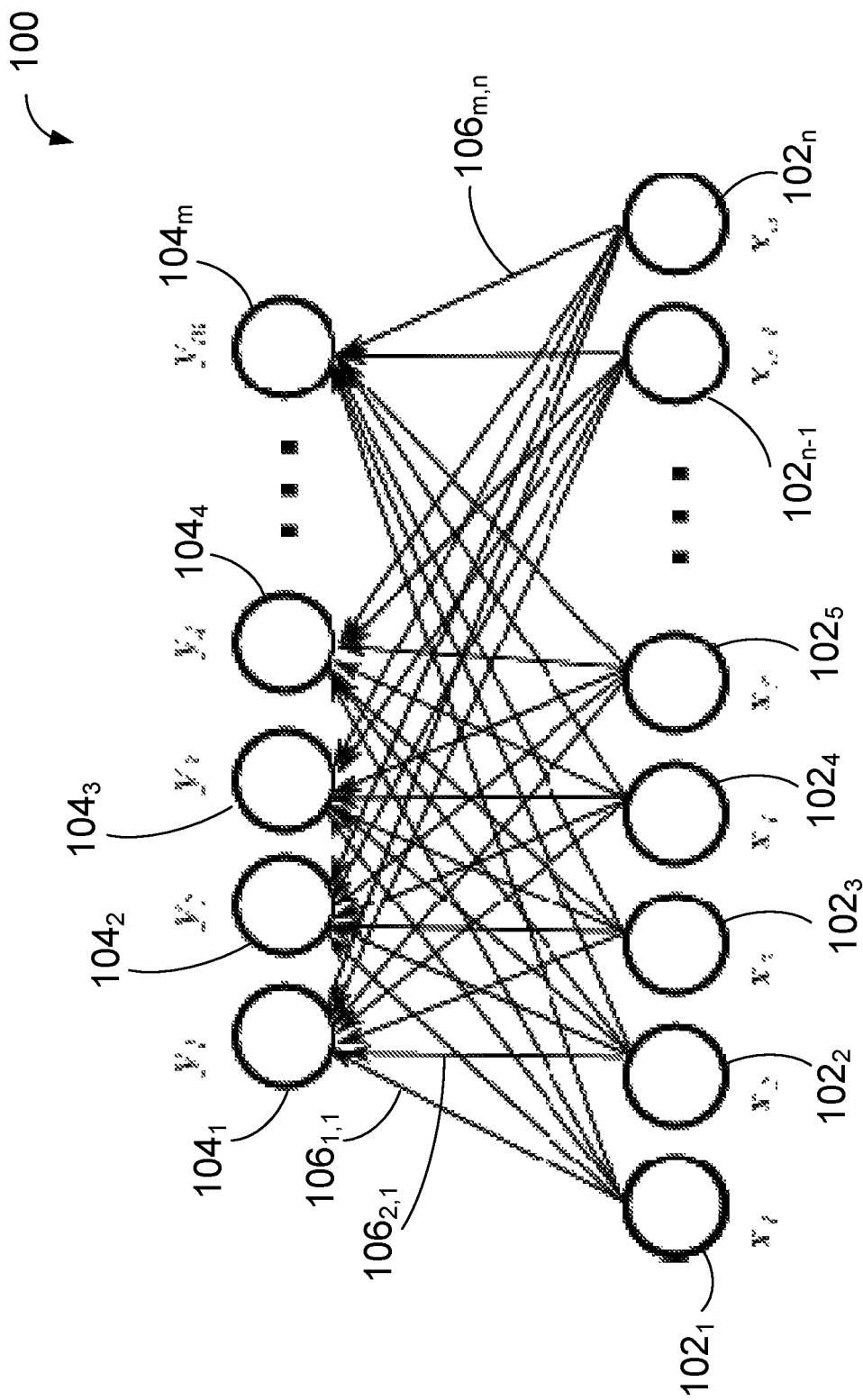
FIG. 1 is a schematic diagram of a fully connected layer of a neural network, as per the prior art.

Referring to FIG. 1, a fully connected layer 100 of a neural network (not shown), as per the prior art, will now be described. In this example, n input nodes $102_1$, $102_2$, $102_3 \ldots 102_n$ are connected to m output nodes $104_1$, $104_2, \ldots 104_m$. More specifically, each input node $102_1$, $102_2, 102_3 \ldots 102_n$ is connected to each output node $104_1$, $104_2, \ldots 104_m$ via a direct connection $106_{1,1}, 106_{2,1}, \ldots 106_{m,n}$. Each connection $106_{1,1}, 106_{2,1}, \ldots 106_{m,n}$ has associated therewith a weight parameter (also referred to herein as a connection parameter or interconnection weight). The weight associated with each connection is used to attenuate or amplify a signal going from the input nodes $102_1, 102_2, 102_3 \ldots 102_n$ to the output nodes $104_1$, $104_2, \ldots 104_m$ and/or to reverse a sign of the signal. In some embodiments, each connection $106_{1,1}, 106_{2,1}, \ldots 106_{m,n}$ has associated therewith a connection parameter used to nullify (when the value of the connection parameter is zero) or not modify (when the value of the connection parameter is one) the signal going from the input nodes $102_1, 102_2, 102_3 \ldots 102_n$ to the output nodes $104_1, 104_2, \ldots 104_m$.

The n input nodes $102_1, 102_2, 102_3 \ldots 102_n$ can be mathematically modelled as an n-dimensional input vector x. The m output nodes $104_1, 104_2, \ldots 104_m$ can be mathematically modelled as an m-dimensional output vector y. The connections $106_{1,1}, 106_{2,1}, \ldots 106_{m,n}$ can then be modelled as an m×n dimensional matrix W of connection parameters (also referred to as weight matrix), such that the output vector y is given by:

$$y = W \cdot x \quad (1)$$

A fully connected layer is thus typically implemented as a matrix-matrix multiplication between the weight matrix W and the input vectors x for every batch of training examples.

Figure 2A:
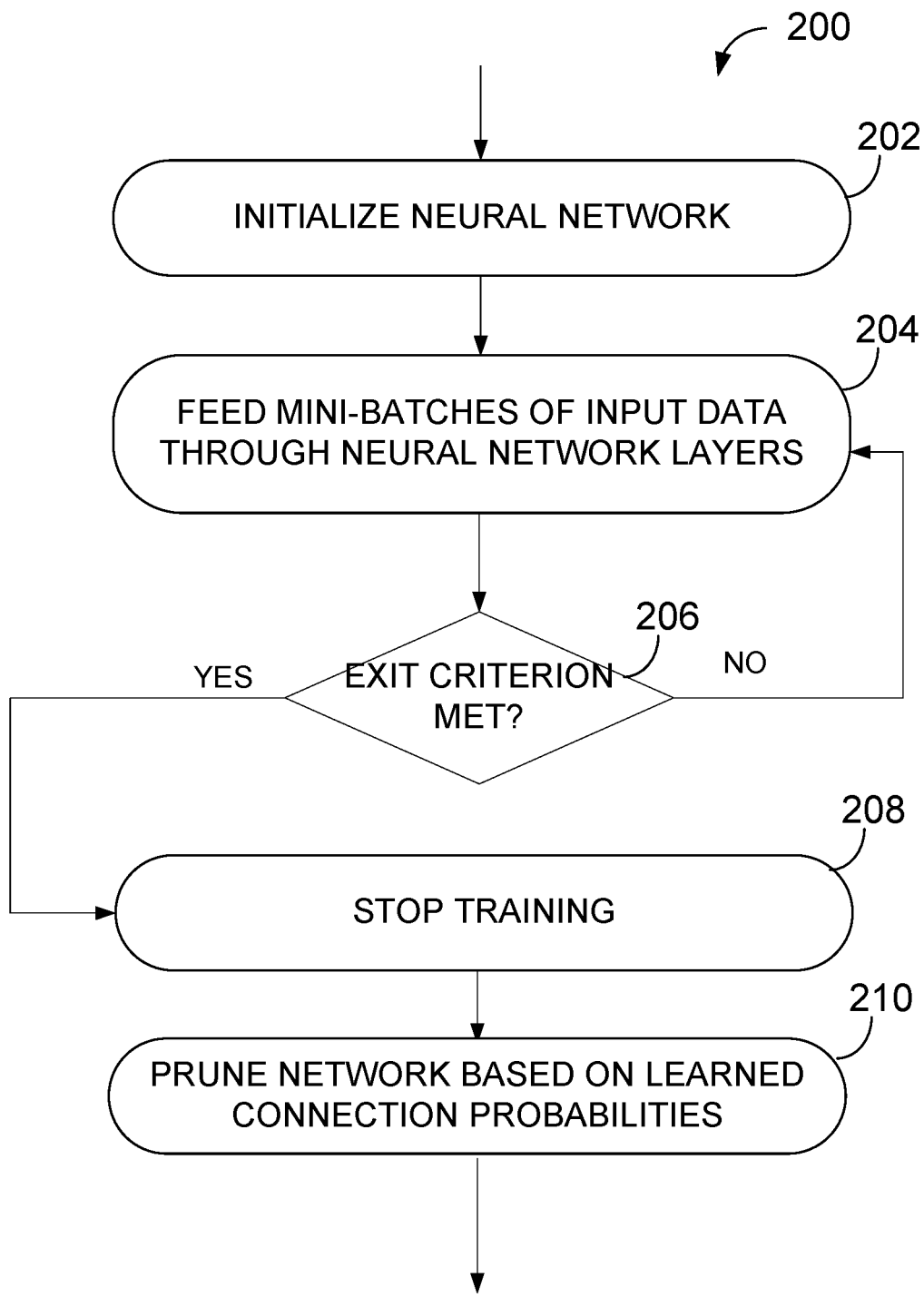
FIG. 2A is a flowchart of an example method for training a neural network comprising a plurality of fully connected layers, in accordance with one embodiment.

Referring now to FIG. 2A, an example method 200 for training a neural network comprising one or more fully connected layers, such as the fully connected layer 100 of FIG. 1, will now be described. It should be understood that, in one embodiment, in addition to comprising one or more fully connected layers, the neural network also comprises other layers, including, but not limited to, convolution layers and pooling layers.

During the training process, the neural network iteratively processes input data to tune the connection parameters to values that minimize or eliminate error. In this manner, feeding a training data set into the neural network (i.e. providing a set of inputs with defined corresponding expected outputs) can be used to improve the neural network configuration. The improved configuration can then be generalized to work on untrained data sets. A large training input data set can typically be split into smaller batches or smaller data sets, referred to herein as mini-batches, which are fed through the neural network layers. In some instances, the size and number of mini-batches can affect time and resource costs associated with training, as well as the performance of the resulting trained neural network (i.e. how accurately the neural network classifies data).

The embodiment described in method 200 thus comprises initializing the neural network at step 202 and feeding mini-batches of input (or training) data through the neural network layers at step 204. As will be discussed further below, step 204 may comprise proceeding with the forward propagation (or feed-forward) phase of the neural network training process. During the feed-forward phase, input data (also referred to as training examples) representing sets of pre-classified data is fed through the neural network layers. The outputs of the neural network are computed by a series of data manipulations as the input data values propagate through the various neural network nodes and weighted connections. In particular, in the embodiment illustrated in FIG. 2A, step 204 comprises feeding the input data through the neural network layers over a randomly (or pseudo-randomly) selected subset of connections, as will be discussed further below. Step 204 may also comprise proceeding with the backward propagation (or backpropagation) phase. In the backpropagation phase, errors between the output values generated during the feed-forward phase and desired output values are computed and propagated back through the neural network layers. In one embodiment, the squared error (or loss L) between the resulting output values and the desired output values is computed as:

$$L = \frac{1}{2} e^T e \quad (2)$$

where the error e is given by: e=y*−y, with y being the resulting output and y* the expected output. It should however be understood that any suitable loss function other than the loss function defined in equation (2) may apply.

Adjustments can then be made to the connection parameters based on the error, a scalar learning rate, and the gradient of the connection parameters (e.g. the interconnection weights). In particular and as will be discussed further below, the backpropagation phase (implemented in step 204) comprises updating one or more interconnection weights and connection probabilities based on the computed error (i.e. based on the loss function) and a predetermined reward strategy.

At step 206, the method 200 assesses whether an exit criterion has been met. If this is the case, the training process is ended at step 208 and the neural network is pruned based on learned connection probabilities (step 210). In particular, connections having a probability below a predetermined value are pruned while other connections are retained. In this manner, sparse fully connected layers can be created. If it is determined at step 206 that the exit criterion is not met, the method 200 proceeds back to step 204.

Figure 2B:
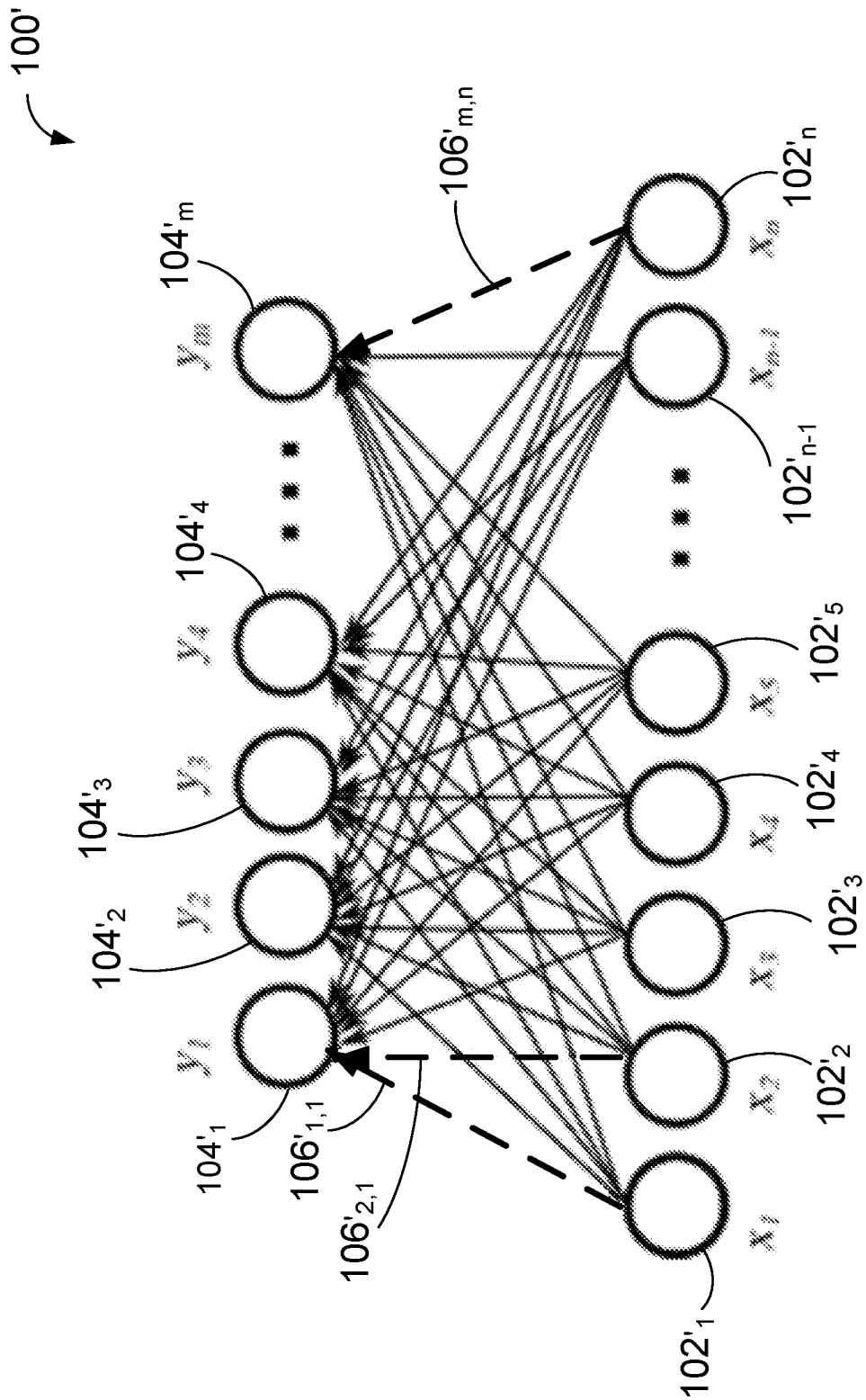
FIG. 2B is a schematic diagram of a sparse fully connected layer, in accordance with one embodiment.

FIG. 2B illustrates a sparse fully connected layer 100', in accordance with one embodiment. The sparse fully connected layer 100' is similar in structure to the fully connected layer (reference 100 in FIG. 1) and comprises the same number (n) of input nodes $102'_1, 102'_2, 102'_3 \ldots 102'_n$ and the same number (m) of output nodes $104'_1, 104'_2, \ldots 104'_m$, as the fully connected layer 100. The sparse fully connected layer 100' however comprises fewer connections than the fully connected layer 100. In some embodiments, the reduction in connections is achieved by removing (or by not including) connections having a probability below a predetermined value. For example, if the fully connected layer 100 is the starting point, the pruned connection $106'_{1,1}$ (shown in dotted lines for clarity purposes) between input node $102'_1$ and output node $104'_1$, the pruned connection $106'_{2,1}$ between input node $102'_2$ and output node $104'_1$, and the pruned connection $106'_{m,n}$ between input node $102'_n$ and output node $104'_m$ are removed so arrive at the sparse fully connected layer 100'.

Figure 3:
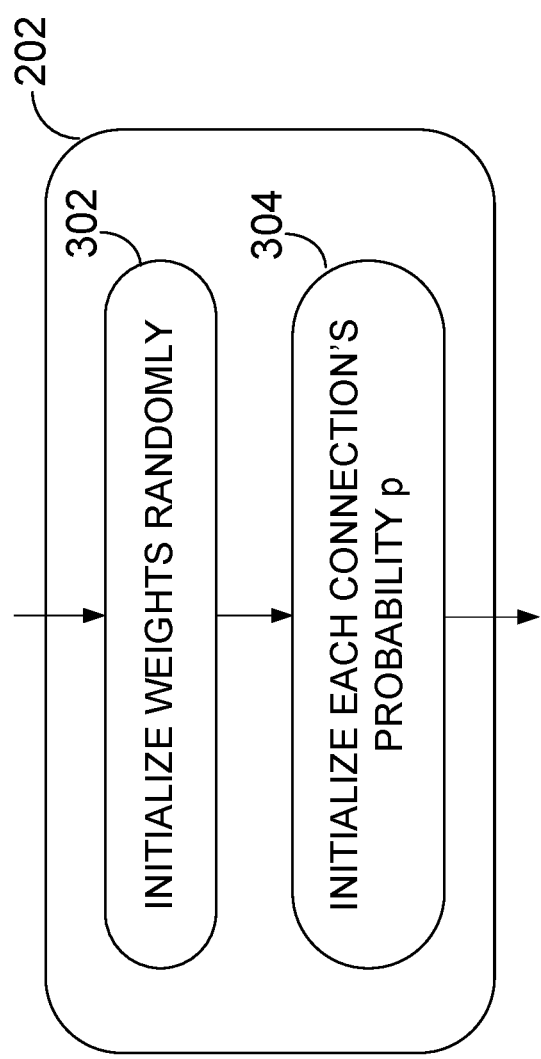
FIG. 3 is a flowchart illustrating an embodiment of the step 202 of FIG. 2A of initializing the neural network.

Referring now to FIG. 3, the step 202 of initializing the neural network comprises initializing the connection parameters (e.g. the interconnection weights) of each connection. For this purpose, the interconnection weights for all connections of each fully connected layer of the neural network are randomly (or pseudo-randomly) initialized at step 302. Step 202 also comprises the step 304 of initializing a probability associated with each connection in the neural network. In addition to having an interconnection weight associated therewith, each connection also has associated therewith a probability p of being included in a given iteration of the training process (also referred to as probability of retention), with p being a value greater than or equal to zero and smaller than or equal to one (i.e. $0 \leq p \leq 1$, also referred to as inclusively bounded). It will be apparent to those skilled in the art that in other embodiments p may be bounded by different values, for example $0 < p < 1$. Each connection (and the corresponding interconnection weight) can be selected with a probability p and temporarily dropped with a probability 1−p. During forward and backward propagation, a selected connection and the interconnection weight associated therewith remain active (i.e. retained in the network) whereas a non-selected connection is inactive (i.e. temporarily dropped or removed from the network) and the interconnection weight associated therewith temporarily omitted. In one embodiment, at step 304, the probability of selecting each connection is initialized randomly from a uniform distribution. In another embodiment, the probability is initialized pseudo-randomly. Each retention probability is selected independently, such that each connection has a different probability of being selected.

Figure 4:
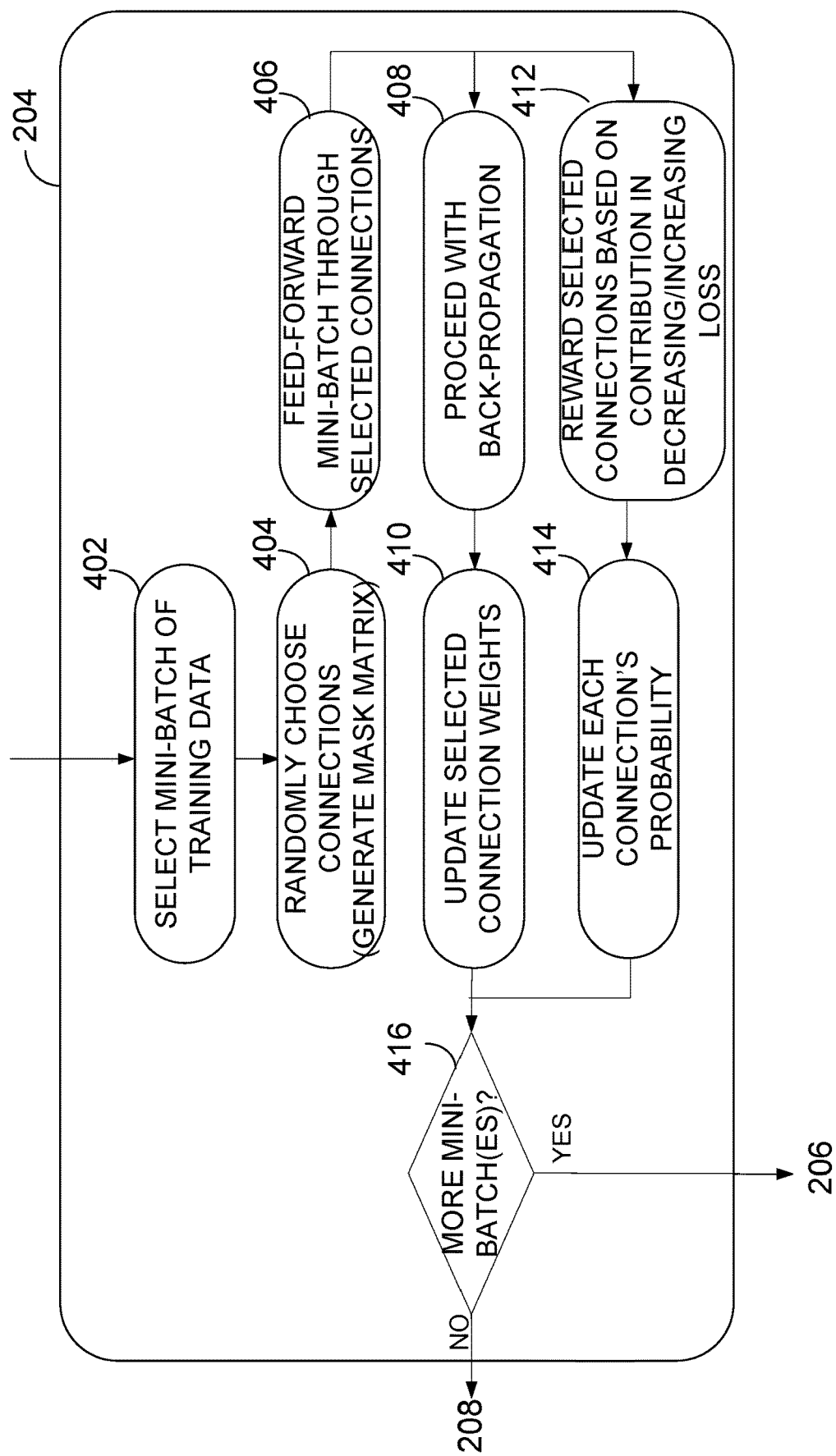
FIG. 4 is a flowchart illustrating an embodiment of the step 204 of FIG. 2A of feeding mini-batches of input data through the neural network layers.

Referring now to FIG. 4, the step 204 of feeding mini-batches of input data through the neural network layers comprises selecting (iteration t=0) a first mini-batch or subset of the training set (step 402). A subset of connections is randomly (or pseudo-randomly) chosen (step 404) with probability p (referred to herein as probability p(t)). For this purpose, in one embodiment, a binary mask matrix M(t) is randomly generated to encode the connection information such that a random number of interconnection weights are kept active while others are masked out (i.e. omitted or ignored) during propagation. The binary mask matrix is generated so as to comprise a random number of elements, which are set to zero, and a random number of elements, which are set to one. The mask matrix is generated during the training stage by randomly selecting matrix element values over a suitable distribution, such as a Gaussian distribution, a Bernoulli distribution, or the like. It should be understood that a pseudo-random distribution may also apply. As a result, a different mask matrix is generated at every iteration of the training process and applied to the interconnection weights, thereby instantiating a different connectivity.

The binary mask matrix M is generated based on the retention probability for each fully connection layer of the neural network. For example, for a fully connected layer having two input nodes and two output nodes, updated retention probabilities (up to iteration step t) can be given as the following probability matrix:

$$P = \begin{pmatrix} 0.1 & 0.6 \\ 0.2 & 0.8 \end{pmatrix} \quad (3)$$

A matrix R is then randomly (or pseudo-randomly) generated with elements in the range [0,1] selected independently from a suitable distribution. For example, the matrix R can be as follows:

$$R = \begin{pmatrix} 0.05 & 0.45 \\ 0.67 & 0.2 \end{pmatrix} \quad (4)$$

Element-wise comparison of matrices P and R is then performed. In particular, each element R[i,j] of the matrix R is compared to each element P[i,j] of the probability matrix P to determine if P[i,j]>R[i,j]. The elements of the binary mask matrix M are then generated accordingly by setting M[i,j] to one if P[i,j]>R[i,j] and setting M[i,j] to zero otherwise. As discussed above, when a given mask matrix element M[i,j] is set to one, the corresponding connection is retained (i.e. included in the given iteration of the training process), whereas the connection is temporarily removed otherwise. It can be seen that the mask matrix is constructed to have the same shape as the weight matrix W. For the example at hand, the following binary mask matrix is obtained:

$$M = \begin{pmatrix} 1 & 1 \\ 0 & 1 \end{pmatrix} \quad (5)$$

Using a mask matrix generated as described above ensures that, for any given iteration t, inclusion or exclusion of connections is affected by previous iterations of the training process.

The mini-batch of training data selected at step 402 is then fed forward (step 406) over the randomly- (or pseudo-randomly-) selected subset of connections (i.e. with a randomly- or pseudo-randomly-selected subset of interconnection weights retained) according to the following formula:

$$W'(t) = W(t) \cdot {}^* M(t) \quad (6)$$

where $\cdot^*$ refers to element-wise multiplication.

Applying the mask matrix M(t) to the weight matrix W(t), as per equation (6), results in an m×n dimensional matrix W'(t) of masked interconnection weights where a random (or pseudo-random) number of interconnection weights is masked out (i.e. set to zero), and therefore omitted during propagation, and a random (or pseudo-random) number of interconnection weights is kept active. The connections associated with the omitted interconnection weights are therefore dropped (or disabled) during propagation whereas the connections associated with the active interconnection weights are enabled during propagation.

For example, a weight matrix W can be given as follows:

$$W = \begin{pmatrix} 1 & 2 \\ 6 & 5 \end{pmatrix} \quad (7)$$

When the masked matrix M given by equation (5) is applied to the weight matrix W given by equation (7), the resulting masked weight matrix W' is given as:

$$W' = \begin{pmatrix} 1 & 2 \\ 0 & 5 \end{pmatrix} \quad (8)$$

where it can be seen that three interconnection weights (having respective values 1, 2, and 5) are retained and used for the current iteration of the training process.

After the input data has been fed forward through the network layers over the randomly- (or pseudo-randomly-) selected connections (i.e. with the randomly- or pseudo-randomly-selected interconnection weights), the method proceeds with the backpropagation step 408, in which errors between outputs (resulting and desired) are propagated back through the neural network layers.

The interconnection weights of the selected connections are then updated based on their gradients (step 410) in order to further reduce the loss when a new mini-batch is fed through the neural network layers at the next iteration. More particularly, the interconnection weights that were active (i.e. the interconnection weights associated with the randomly- or pseudo-randomly-drawn subset of connections) during the forward pass of the training examples are updated based on the error, learning rate, and the gradients of the interconnection weights using the following formula:

$$W'(t+1)=W'(t)-\alpha \Delta W' \quad (9)$$

where W is the masked weight matrix given by equation (6), t is the time step, $\alpha$ is the learning rate (e.g. a scalar lower than one), and the gradients of the interconnection weights are computed as:

$$\Delta W' = \frac{\partial L}{\partial W'} \quad (10)$$

Figure 5:
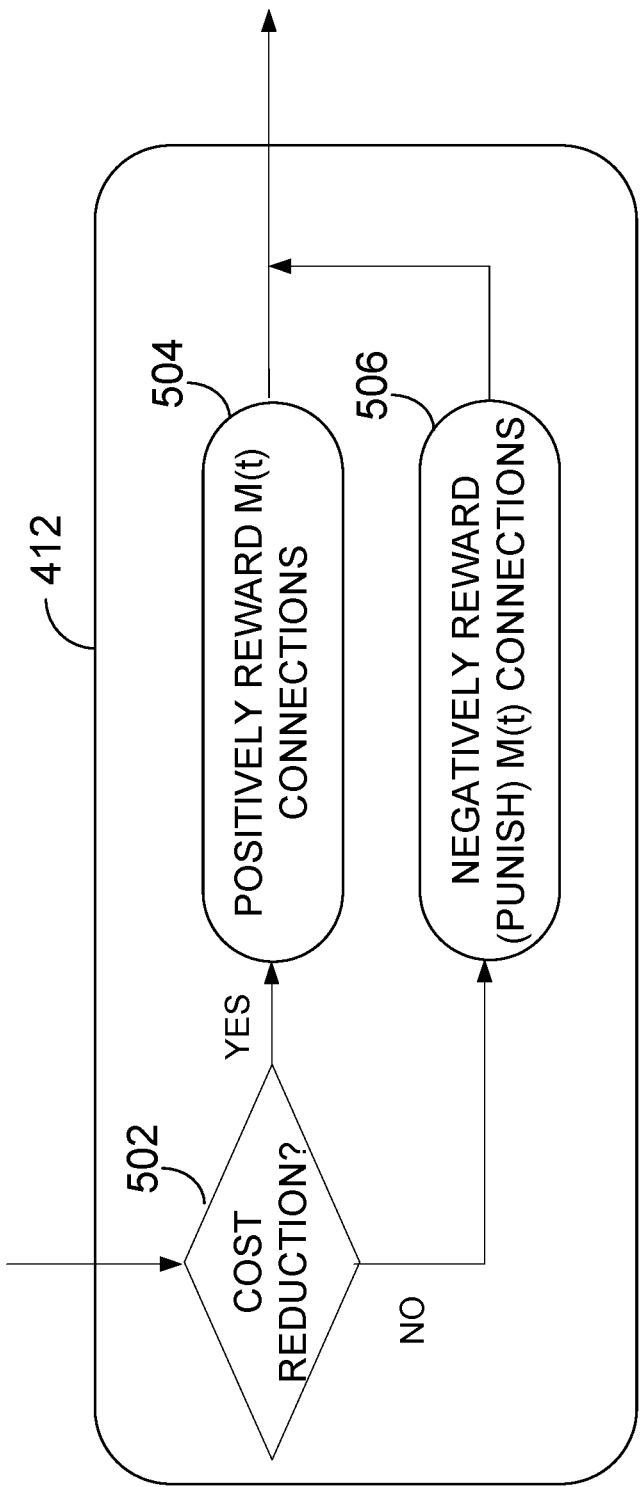
FIG. 5 is a flowchart illustrating an embodiment of the step 412 of FIG. 4 of rewarding connections based on their contribution to decreasing or increasing a loss.

The selected connections are also rewarded based on their contribution to decreasing or increasing the loss (step 412). For this purpose and as illustrated in FIG. 5, it is determined (step 502) whether a cost function (i.e. the error between the resulting and desired output values) has been reduced by feeding the input data through the neural network layers over the randomly- (or pseudo-randomly-) selected connections. A reinforcement signal is then generated based on the contribution of the randomly- (or pseudo-randomly-) selected subset of connections to the cost function. Generating the reinforcement signal comprises attributing a positive reward to the subset of connections if the cost function has been reduced (step 504) and attributing a negative reward (or punishment) to the subset of connections otherwise (step 506). In this manner, it can be ensured that the connections that do not reduce the cost function will be less likely to be chosen during the next iterations of the training process.

In one embodiment, attributing the positive reward comprises increasing the probability of retention associated with each connection in the randomly- (or pseudo-randomly-) selected subset of connections by a predetermined value. In other words, a predetermined positive value is added to the current probability value. In one embodiment, attributing the negative reward comprises decreasing the probability of retention associated with each connection in the randomly- (or pseudo-randomly-) selected subset of connections by a predetermined value. In this case, a predetermined value, which may be negative, null, or positive, is added to the current probability value. It should be understood that when positive values are used for both the positive reward and the negative reward (or punishment), the relative magnitude between the two rewards may be such that the positive reward is larger than the negative reward. It should however be understood that other embodiments may apply and that other reward functions may apply. For example, the reward function may be a function of a predetermined probability value and the gradients of the interconnection weights. In this case, the retention probabilities are updated proportionally to the weight update.

Referring back to FIG. 4, the probability of each randomly- (or pseudo-randomly-) selected connection is then updated at step 414. In one embodiment, the update is performed using the following equation:

$$P(c_i^t) \leftarrow P(c_i^{t-1}) + \alpha(R^t - P(c_i^{t-1})) \quad (11)$$

where $P(c_i^t)$ is to the probability of connection i at iteration t.

In order to ensure that the probabilities remain between zero and one (inclusively), a sigmoid function may be used to restrict the probabilities to remain within the desired range. In this case, the probability of connection i is given as:

$$P(c_i^t) = \frac{1}{1+e^{-q_i^t}} \quad (12)$$

The connection probabilities can be updated at each iteration (step 414) by updating the value of $q_i^t$ (referred to herein as the q value). In particular, a reward (positive or negative, as discussed above) is attributed to $q_i^t$. The sigmoid function of the updated q value is then used as the updated probability value. It should however be understood that other embodiments may apply. For example, after updating each connection's probability at step 414, each probability may be normalized so that it remains inclusively bounded between zero and one.

It should also be understood that the steps of updating the interconnection weights and the connection probabilities may be performed in sequence or in parallel.

After the selected interconnection weights and each connection's probability are updated (respective steps 410 and 414), the next step 416 is to assess whether to feed more mini-batches of training data. If this is not the case, the method 200 flows to the step 208 of FIG. 2A of stopping the training process. Otherwise, the method 200 flows to the step 206 of FIG. 2A, where it is determined whether the exit criterion is met. As discussed above with reference to FIG. 2A, the training process is stopped (step 208) if the exit criterion is met. If the exit criterion is not met, the method 200 flows back to step 204 and a new mini-batch is selected and fed-forward through the network layers over a new subset of randomly- (or pseudo-randomly-) drawn connections (iteration t+1). In one embodiment, step 206 comprises assessing whether a maximum training time or a maximum number of iterations has been exceeded. It should be understood that other embodiments may apply. For example, step 206 may comprise assessing whether the error between the resulting output values and the desired output values is greater than a predetermined threshold.

It should also be understood that step 206 may be performed at other points during the method 200. For example, step 206 may be performed at the beginning of each iteration t (rather than at the end of the iteration, as illustrated). Step 206 may also be performed prior to proceeding with the back-propagation phase. Step 206 may also be performed after the selected interconnection weights are updated. Other embodiments may apply.

Using the method described herein, the fully connected neural network layer is transformed into a sparsely connected layer after training is done by selecting the connections whose probabilities are greater than a predetermined threshold value. The threshold value is between zero and one (inclusively) and the higher the threshold value, the more sparse the neural network. In particular, important connection parameters (i.e. interconnection weights that have a strong contribution in decreasing the cost function and accordingly connections that should be retained in the network more often) are learned throughout the training phase and then pruned by selecting the connections whose probabilities are over the predetermined threshold value.

The number of connection parameters in consecutive network layers can then be reduced, leading to a decrease in network complexity and over-fitting.

Figure 6:
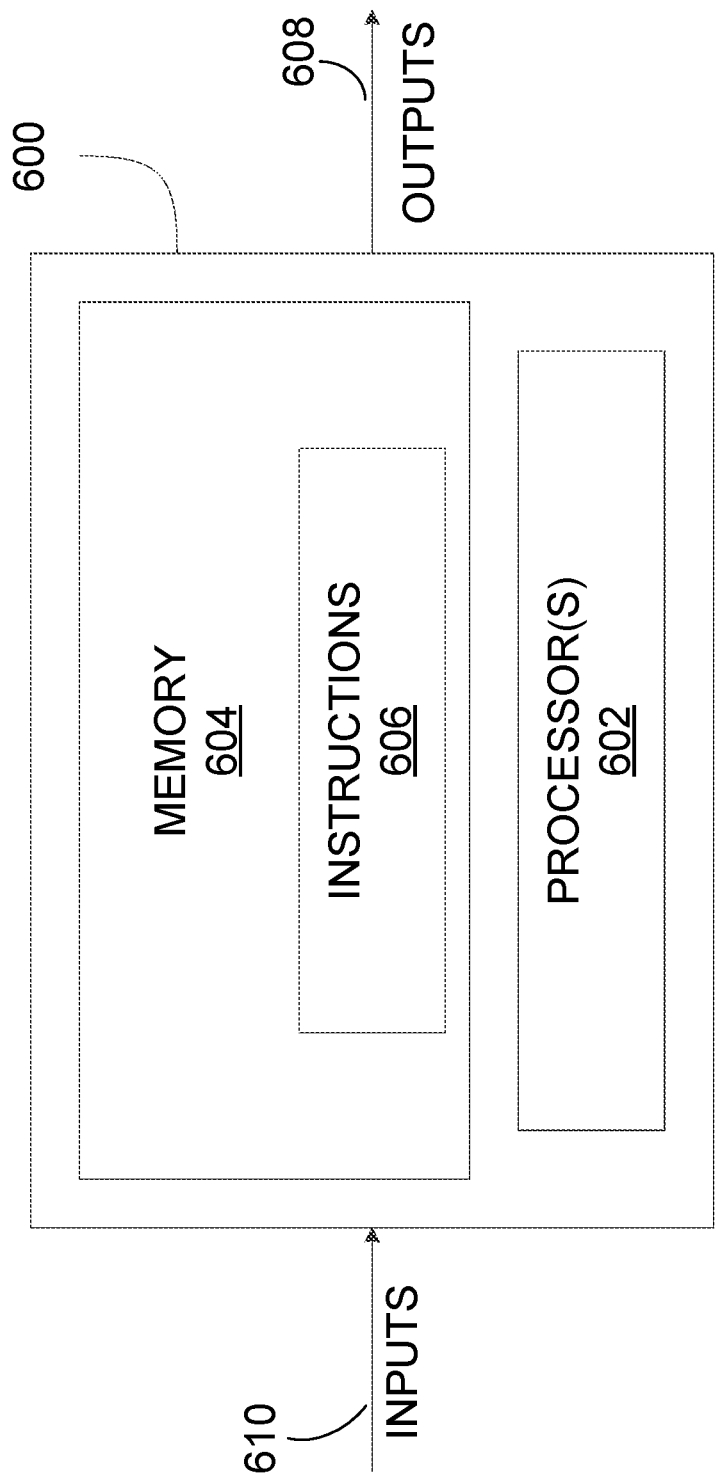
FIG. 6 is a block diagram of an example computing device for implementing embodiments of the present invention.

Referring now to FIG. 6, the method described herein with reference to FIG. 2A to FIG. 5 may be implemented on one or more computing devices (also referred to herein as neural network units) 600. As will be discussed further below, a neural network unit can be configured to implement a portion of a neural network layer. For example, a neural network unit can include components configured to implement both forward and backward propagation stages of a neural network layer. For this purpose, computing device 600 may comprise one or more processors 602 and one or more computer-readable memories 604 storing machine-readable instructions 606 executable by processor(s) 602 and configured to cause processor(s) 602 to generate one or more outputs 608 based on one or more inputs 610. In some embodiments, the inputs 610 may be received via a communication interface (not shown) and/or memory 604. In some embodiments, the computing device 600 is configured to communicate the outputs 608 via a communication interface (not shown) and/or memory device 604. The inputs 610 may include values for processing during the feed-forward phase and/or error values for processing during the back-propagation phase.

Processor(s) 602 may comprise any suitable device(s) configured to cause a series of steps to be performed by computing device 600 so as to implement a computer-implemented process such that instructions 606, when executed by computing device 600 or other programmable apparatus, may cause the functions/acts specified in the methods described herein to be executed. Processor(s) 602 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 604 may comprise any suitable known or other machine-readable storage medium. Memory 604 may comprise non-transitory computer readable storage medium such as, but not limited to, an electronic, magnetic, optical, electromagnetic, infrared, or semiconductor system, apparatus, or device, or any suitable combination of the foregoing. Memory 604 may include a suitable combination of any type of computer memory that is located either internally or externally to computing device 600 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g. devices) suitable for retrievably storing machine-readable instructions 606 executable by processor(s) 602.

Memory 604 can, in some embodiments, be configured to store connection parameter data, error data, and/or any other data and/or instructions that may be used in the performance of one or more aspects of a neural network layer. Processor(s) 602, in some embodiments, is configured to access the memory 604 to access parameter values for the computation of a connection parameter (e.g. interconnection weight or probability) value, an error value, and/or a value for use in another layer. In some embodiments, the memory 604 is part of the computing device 600, as illustrated. In other embodiments, the memory device 604 is separate from the computing device 600 and may be accessed via one or more communication interfaces.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 604) having computer readable program code (e.g., instructions 606) embodied thereon. The computer program product may, for example, be executed by computing device 600 to cause the execution of one or more methods disclosed herein in entirety or in part.

Computer program code for carrying out operations for aspects of the present disclosure in accordance with instructions 606 may be written in any combination of one or more programming languages, including an object oriented programming language such as Java, Smalltalk, C++ or the like and conventional procedural programming languages, such as the "C" programming language or other programming languages. Such program code may be executed entirely or in part by computing device 600 or other processing device(s). It is understood that, based on the present disclosure, one skilled in the relevant arts could readily write computer program code for implementing the methods disclosed herein.

Computer-executable instructions 606 may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Figure 7:
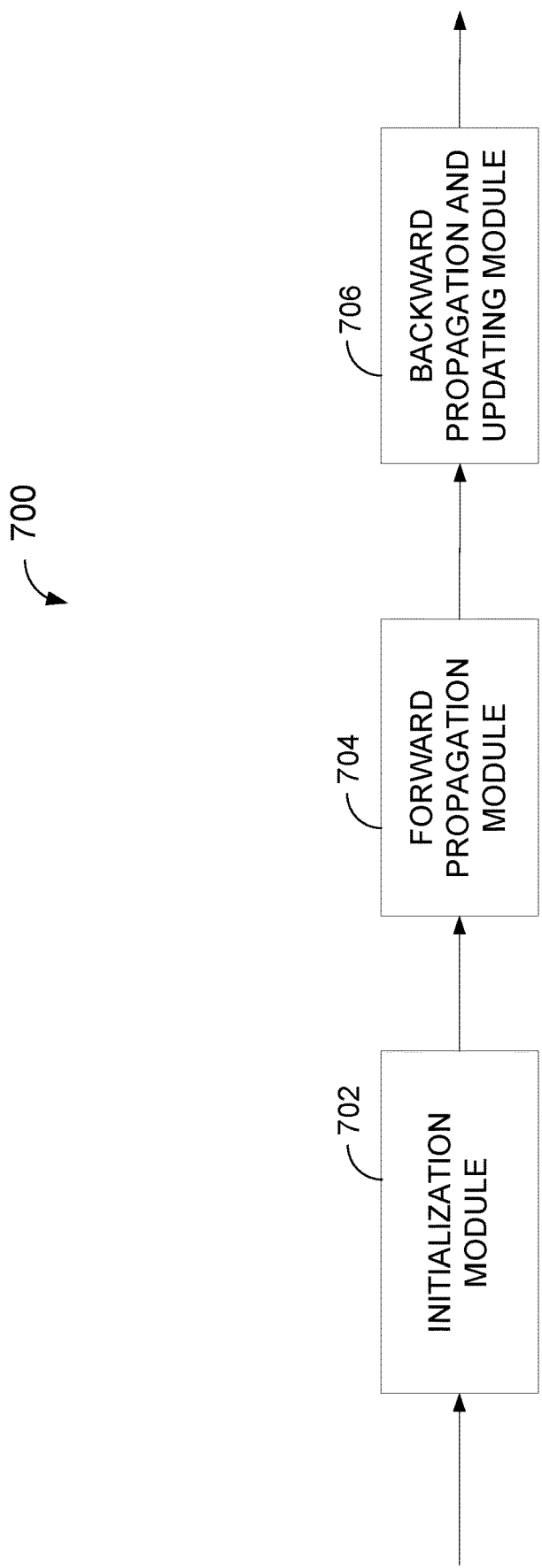
FIG. 7 is a block diagram of an example system for training a neural network comprising a plurality of fully connected layers, in accordance with one embodiment.

FIG. 7 is an example of a system 700 for training a neural network comprising one or more fully connected layers, in accordance with one embodiment. The system 700 may be implemented on one or more computing devices (or neural network units) 600 of FIG. 6. The system 700 comprises an initialization module 702, a forward propagation module 704, and a backward propagation and updating module 706.

In the illustrated embodiment of FIG. 7, the initialization module 702 is used to randomly (or pseudo-randomly) initialize the interconnection weights as well as initialize the probability of retention of each connection in the neural network, as described above with reference to steps 302 and 304 of FIG. 3. The forward propagation module 704 and the backward propagation and updating module 706 respectively implement the forward propagation phase and the backward propagation phase of the neural network training process.

Figure 8A:
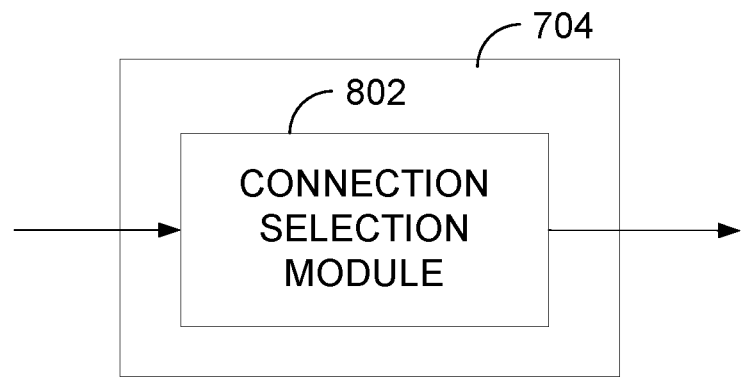
FIG. 8A is a block diagram of the forward propagation module of FIG. 7.
Figure 8B:
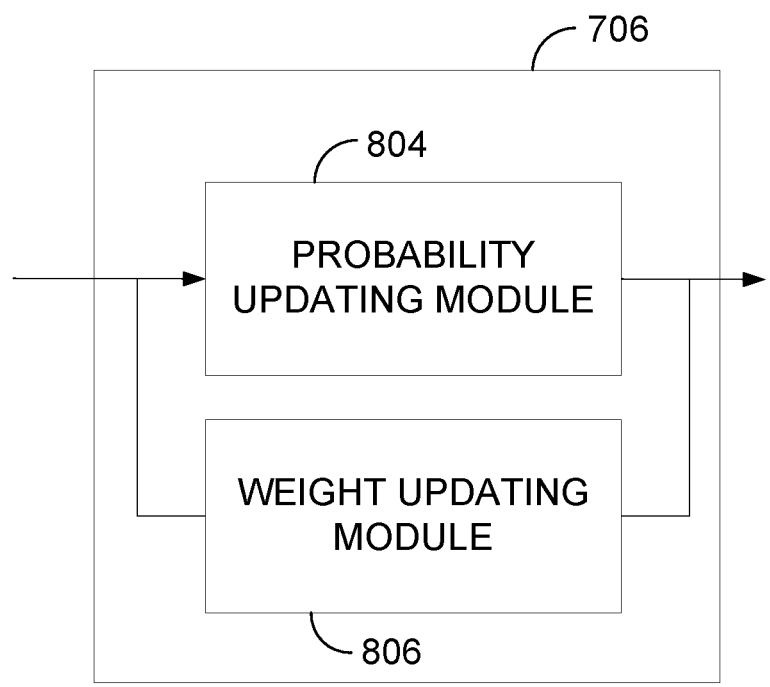
FIG. 8B is a block diagram of the backward propagation and updating module of FIG. 7.

Referring to FIG. 8A and FIG. 8B, the forward propagation module 704 comprises a connection selection module 802 that randomly (or pseudo-randomly) generates a binary mask matrix that is applied to the interconnection weights to randomly (or pseudo-randomly) select (with probability p) a subset of connections over which input data is fed, as discussed above with reference to steps 404 and 406 of FIG. 4. The backward propagation and updating module 706 comprises a probability updating module 804 and a weight updating module 806. The probability updating module 804 determines whether the interconnection weights associated with the subset of connections contribute to the error between the outputs resulting from the feed-forward phase and the desired outputs. The probability updating module 804 then updates the probability of retention of each connection in the subset of connections according to the determined contribution. In particular, and as discussed above with reference to steps 504 and 506 of FIG. 5, the probability updating module 804 generates a reinforcement signal comprising a positive reward (i.e. an increase in the probability of retention) for connections that contribute to reducing the error and a negative reward (i.e. a decrease in the probability of retention) for connections that contribute to increasing the error. The weight updating module 806 is used to update the interconnection weights associated with each connection in the subset of connections in an effort to reduce the error on the next forward and backward propagation.

The above description is meant to be for purposes of example only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified.

Although illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. Based on such understandings, the technical solution of the present invention may be embodied in the form of a software product. The software product may be stored in a non-volatile or non-transitory storage medium, which can be a read-only memory (ROM), a magnetic disk, an optical disc, a flash drive, or any other suitable storage media or device.

Each computer program described herein may be implemented in a high level procedural or object oriented programming or scripting language, or a combination thereof, to communicate with a computer system. Alternatively, the programs may be implemented in assembly or machine language. The language may be a compiled or interpreted language. The software product includes a number of instructions that enable a computer device (personal computer, server, or network device) to execute the methods provided in the embodiments of the present invention. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The structure illustrated is thus provided for efficiency of teaching the present embodiment. The present disclosure may be embodied in other specific forms without departing from the subject matter of the claims.

Also, one skilled in the relevant arts will appreciate that although the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A method for training a neural network, the neural network comprising at least one fully connected layer comprising a plurality of input nodes, a plurality of output nodes, and a plurality of connections for connecting each one of the plurality of input nodes to each one of the plurality of output nodes, the method comprising:

for each connection of the plurality of connections associated with an interconnection weight and a retention probability, pseudo-randomly setting the retention probability to a value of p greater than or equal to zero and smaller than or equal to one, wherein the retention probability associated with the each connection represents a probability of the interconnection weight being retained in the neural network;

pseudo-randomly selecting one or more connections of the plurality of connections, wherein the pseudo-randomly selecting comprises:

applying a pseudo-randomly generated binary mask to each interconnection weight for selecting first ones of the plurality of connections with associated retention probability having the value of p for retention and for temporarily dropping second ones of the plurality of connections with associated retention probability having a value of 1−p;

generating output data by feeding input data to the one or more connections;

computing an error between the generated output data and desired output data associated with the input data; and for each respective connection of the one or more connections, determining a contribution of the interconnection weight to the error and adaptively updating the retention probability associated with the respective connection by attributing a positive reward to the respective connection when the interconnection weight associated with the respective connection contributes to reducing the error and attributing a negative reward to the respective connection when the interconnection weight associated with the respective connection contributes to increasing the error; and repeating, for a plurality of training iterations, the pseudo-randomly selecting, the generating, the computing, the determining, and the adaptively updating.

2. The method of claim 1, wherein the applying the pseudo-randomly generated binary mask to each interconnection weight comprises:

applying a unitary mask element to the interconnection weight associated with each respective connection of the first ones of the plurality of connections and applying a null mask element to the interconnection weight associated with each respective connection of the second ones of the plurality of connections.

3. The method of claim 2, further comprising generating a binary mask matrix, the generating the binary mask matrix comprising:

generating a pseudo-random matrix, each element of the pseudo-random matrix having a value greater than or equal to zero and smaller than or equal to one;

comparing the each element of the pseudo-random matrix to a corresponding element of a probability matrix, the each element of the probability matrix corresponding to the retention probability associated with a given one of the plurality of connections;

assigning a value of one to the corresponding element of the binary mask matrix when the element of the probability matrix is greater than the element of the pseudo-random matrix; and assigning a value of zero to the corresponding element of the binary mask matrix when the element of the probability matrix is not greater than the element of the pseudo-random matrix.

4. The method of claim 1, wherein the pseudo-randomly selecting the one or more connections of the plurality of connections comprises:

generating a random sampling value for each respective connection of the plurality of connections; and for the each respective connection of the plurality of connections, selecting the respective connection when the random sample value is less than the retention probability associated with the respective connection.

5. The method of claim 4, further comprising:

attributing the positive reward comprises increasing the retention probability associated with the each respective connection; and attributing the negative reward comprises decreasing the retention probability associated with the each respective connection.

6. The method of claim 1, further comprising:

for each respective connection, modifying the interconnection weight associated therewith for reducing the error upon new input data being fed through the at least one fully connected layer, the interconnection weight modified based on a gradient of the interconnection weight.

7. The method of claim 1, further comprising:

pruning ones of the plurality of connections of the plurality of connections from the at least one fully connected layer of the neural network which have an associated retention probability below a predetermined threshold value.

8. A neural network unit comprising:

at least one processing unit; and a non-transitory memory communicatively coupled to the at least one processing unit and comprising computer-readable program instructions that when executed by the at least one processing unit, cause the neural network unit to perform operations for training a neural network, the neural network comprising at least one fully connected layer comprising a plurality of input nodes, a plurality of output nodes, and a plurality of connections for connecting each one of the plurality of input nodes to each one of the plurality of output nodes, the operations including:

for each connection of the plurality of connections associated with with an interconnection weight and a retention probability, pseudo-randomly setting the retention probability to a value of p greater than or equal to zero and smaller than or equal to one, wherein the retention probability associated with the each connection represents a probability of the interconnection weight being retained in the neural network;

pseudo-randomly select one or more connections of the plurality of connections, wherein the pseudo-randomly selecting comprises:

applying a pseudo-randomly generated binary mask to each interconnection weight for selecting first ones of the plurality of connections with associated retention probability having the value of p for retention and for temporarily dropping second ones of the plurality of connections with associated retention probability having a value of 1−p;

generating output data by feeding input data to the one or more connections;

computing an error between the generated output data and desired output data associated with the input data; and for each respective connection of the one or more connections, determining a contribution of the interconnection weight to the error and adaptively updating the retention probability associated with the respective connection by attributing a positive reward to the respective connection when the interconnection weight associated with the respective connection contributes to reducing the error and attributing a negative reward to the respective connection when the interconnection weight associated with the respective connection contributes to increasing the error; and repeating, for a plurality of training iterations, pseudo-randomly selecting, generating, computing, determining, and adaptively updating.

9. The neural network unit of claim 8, wherein the applying the pseudo-randomly generated binary mask to each interconnection weight comprises:

applying a unitary mask element to the interconnection weight associated with each respective connection of the first ones of the plurality of connections and apply a null mask element to the interconnection weight associated with each respective connection of the second ones of the plurality of connections.

10. The neural network unit of claim 9, the operations further comprising generating a binary mask matrix, the generating the binary mask matrix comprising:

generating a pseudo-random matrix, each element of the pseudo-random matrix having a value greater than or equal to zero and smaller than or equal to one;

comparing the each element of the pseudo-random matrix to a corresponding element of a probability matrix, the each element of the probability matrix corresponding to the retention probability associated with a given one of the plurality of connections;

assigning a value of one to the corresponding element of the binary mask matrix when the element of the probability matrix is greater than the element of the pseudo-random matrix; and assigning a value of zero to the corresponding element of the binary mask matrix when the element of the probability matrix is not greater than the element of the pseudo-random matrix.

11. The neural network unit of claim 8, wherein the pseudo-randomly selecting the one or more connections of the plurality of connections comprises:

generating a random sampling value for each respective connection of the plurality of connections; and for the each respective connection of the plurality of connections, selecting the respective connection when the random sample value is less than the retention probability associated with the respective connection.

12. The neural network unit of claim 11, the operations further comprising:

attributing the positive reward comprising increasing the retention probability associated with the each respective connection; and attributing the negative reward comprising decreasing the retention probability associated with the each respective connection.

13. The neural network unit of claim 8, the operations further comprising:

modifying the interconnection weight associated with each respective connection based on a gradient of the interconnection weight for reducing the error upon new input data being fed through the fully connected layer.

14. The neural network unit of claim 8, wherein the pseudo-randomly selecting comprises:

generating random sampling values, each of the random sampling values corresponding to one of the plurality of connections;

comparing each retention probability associated with each of the plurality of connections with a corresponding random sampling value; and selecting the one or more connections based on the comparing, wherein each retention probability associated each of the one or more connections is greater than the corresponding random sampling value.

15. A non-transitory computer readable medium having stored thereon program code executable by at least one processor to perform operations for training a neural network, the neural network comprising at least one fully connected layer comprising a plurality of input nodes, a plurality of output nodes, and a plurality of connections for connecting each one of the plurality of input nodes to each one of the plurality of output nodes, the operations including:

for each connection of the plurality of connections associated with with an interconnection weight and a retention probability, pseudo-randomly setting the retention probability to a value of p greater than or equal to zero and smaller than or equal to one, wherein the retention probability associated with the each connection represents a probability of the interconnection weight being retained in the neural network;

pseudo-randomly selecting one or more connections of the plurality of connections, wherein the pseudo-randomly selecting comprises:

applying a pseudo-randomly generated binary mask to each interconnection weight for selecting first ones of the plurality of connections with associated retention probability having the value of p for retention and for temporarily dropping second ones of the plurality of connections with associated retention probability having a value of 1−p;

generating output data by feeding input data to the one or more connections;

computing an error between the generated output data and desired output data associated with the input data; and for each respective connection of the one or more the plurality of connections, determining a contribution of the interconnection weight to the error and adaptively updating the retention probability associated with the respective connection associated with the respective connection by attributing a positive reward to the respective connection when the interconnection weight associated with the respective connection contributes to reducing the error and attributing a negative reward to the respective connection when the interconnection weight associated with the respective connection contributes to increasing the error; and repeating, for a plurality of training iterations, the pseudo-randomly selecting, the generating, the computing, the determining, and the adaptively updating.

16. The method of claim 1, wherein the pseudo-randomly selecting comprises:

generating random sampling values, each of the random sampling values corresponding to one of the plurality of connections;

comparing each retention probability associated with each of the plurality of connections with a corresponding random sampling value; and selecting the one or more connections based on the comparing, wherein each retention probability associated each of the one or more connections is greater than the corresponding random sampling value.

* * * * *